(12) United States Patent
Granlund

(10) Patent No.: US 7,333,961 B2
(45) Date of Patent: Feb. 19, 2008

(54) TRAINING OF ASSOCIATIVE NETWORKS

(76) Inventor: Gosta Granlund, Valhallagatan 16, Linkoping (SE) S-582 43

( * ) Notice: Subject to any disclaimer, the term of this patent is extended or adjusted under 35 U.S.C. 154(b) by 352 days.

(21) Appl. No.: 10/399,666

(22) PCT Filed: Oct. 19, 2001

(86) PCT No.: PCT/SE01/02285

§ 371 (c)(1),
(2), (4) Date: Apr. 21, 2003

(87) PCT Pub. No.: WO02/37302

PCT Pub. Date: May 10, 2002

(65) Prior Publication Data

US 2004/0044634 A1 Mar. 4, 2004

(30) Foreign Application Priority Data

Oct. 31, 2000 (SE) .................................. 0003975

(51) Int. Cl.
*G06F 15/18* (2006.01)
*G06F 15/00* (2006.01)

(52) U.S. Cl. ..................... 706/14; 706/12; 382/159
(58) Field of Classification Search ................. 706/16, 706/14, 12; 382/159
See application file for complete search history.

(56) References Cited

U.S. PATENT DOCUMENTS 6,496,184 B1 * 12/2002 Freeman et al. ............ 345/419
2002/0009132 A1 * 1/2002 Miller ........................ 375/222

* cited by examiner

*Primary Examiner*—Anthony Knight
*Assistant Examiner*—Adrian Kennedy
(74) *Attorney, Agent, or Firm*—Young & Thompson

(57) ABSTRACT

An artificial vision system traning method starts by forming (S2) a feature matrix including feature sample vectors and a corresponding response sample vector including response sample scalars. The method then uses an iterative procedure to determine a linkage vector linking the response sample vector to the feature matrix. This iterative procedure includes the steps: determining (S4) a response sample vector error estimate in the response sample vector domain; transforming (S6) the response sample vector error estimate into a corresponding linkage vector error estimate in the linkage vector domain; determining (S7) a linkage vector estimate in the linkage vector domain by using the linkage vector error estimate; transforming (S8) the linkage vector estimate into a corresponding response sample vector estimate in the response sample vector domain. These steps are repeated until (S5) the response sample vector error estimate is sufficiently small.

20 Claims, 2 Drawing Sheets

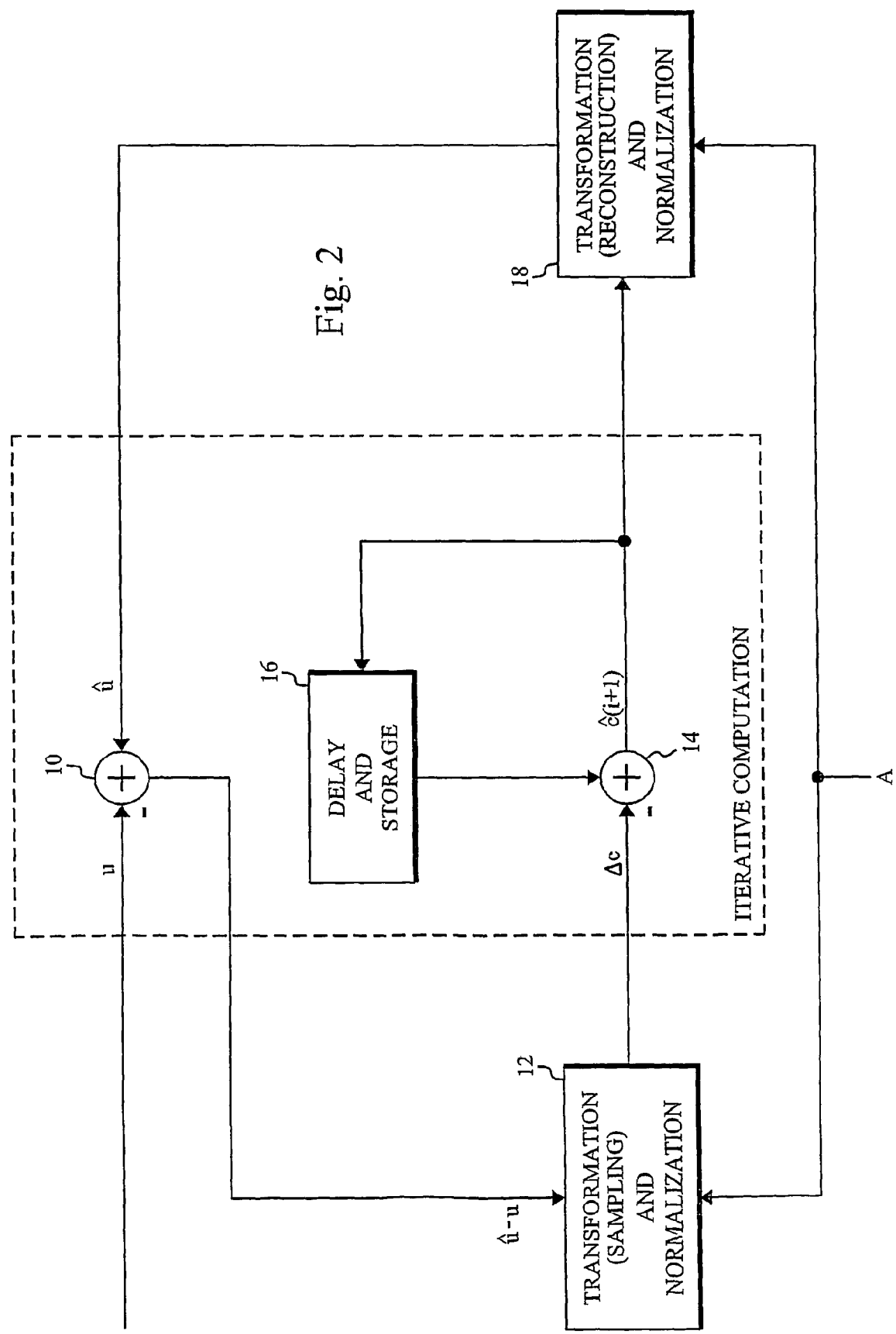

TRAINING OF ASSOCIATIVE NETWORKS

TECHNICAL FIELD

The present invention relates to training of associative networks, and particularly to training of artificial vision systems or percept-response systems.

BACKGROUND

WO 00/58914 describes a percept-response system based on channel representation of information. A link matrix C links a feature vector a, which has been formed from a measured percept (column) vector x, to a response (column) vector u using the matrix equation:

$$u = Ca \qquad (1)$$

A fundamental consideration in these systems is system training, i.e., how to determine the linkage matrix C. In WO 00/58914 this is accomplished by collecting different training sample pairs of feature vectors $a^i$ and response vectors $u^i$. Since each pair should be linked by the same linkage matrix C, the following set of equations is obtained:

$$U = \begin{pmatrix} u_1^1 & u_1^2 & \cdots & u_1^N \\ u_2^1 & u_2^2 & \cdots & u_2^N \\ \vdots & \vdots & \vdots & \vdots \\ u_K^1 & u_K^2 & \cdots & u_K^N \end{pmatrix} \qquad (2)$$

$$= \begin{pmatrix} c_{11} & c_{12} & \cdots & c_{1H} \\ c_{21} & c_{22} & \cdots & c_{2H} \\ \vdots & \vdots & \vdots & \vdots \\ c_{KI} & c_{K2} & \cdots & c_{KH} \end{pmatrix} \begin{pmatrix} a_1^1 & a_1^2 & \cdots & a_1^N \\ a_2^1 & a_2^2 & \cdots & a_2^N \\ \vdots & \vdots & \vdots & \vdots \\ a_H^1 & a_H^2 & \cdots & a_H^N \end{pmatrix}$$

$$= CA$$

where N denotes the number of training samples or the length of the training sequence and A is denoted a feature matrix. These equations may be solved by conventional approximate methods (typically methods that minimize mean squared errors) to determine the linkage matrix C (see for example Using MATLAB, MathWorks Inc, 1996, pp. 4-2-4-3, 4-13-4-14). However, a drawback of these approximate methods is that they restrict the complexities of associative networks to an order of thousands of features and thousands of samples, which is not enough for many systems.

SUMMARY OF THE INVENTION

An object of the present invention is a more efficient training procedure that allows much larger associative networks.

This object is achieved as disclosed below.

BRIEF DESCRIPTION OF THE DRAWINGS

The invention, together with further objects and advantages thereof, may best be understood by making reference to the following description taken together with the accompanying drawings, in which:

FIG. 2 is a diagram illustrating the structure of a training system in accordance with the present invention.

DETAILED DESCRIPTION OF THE PREFERRED EMBODIMENTS

Figure 1:
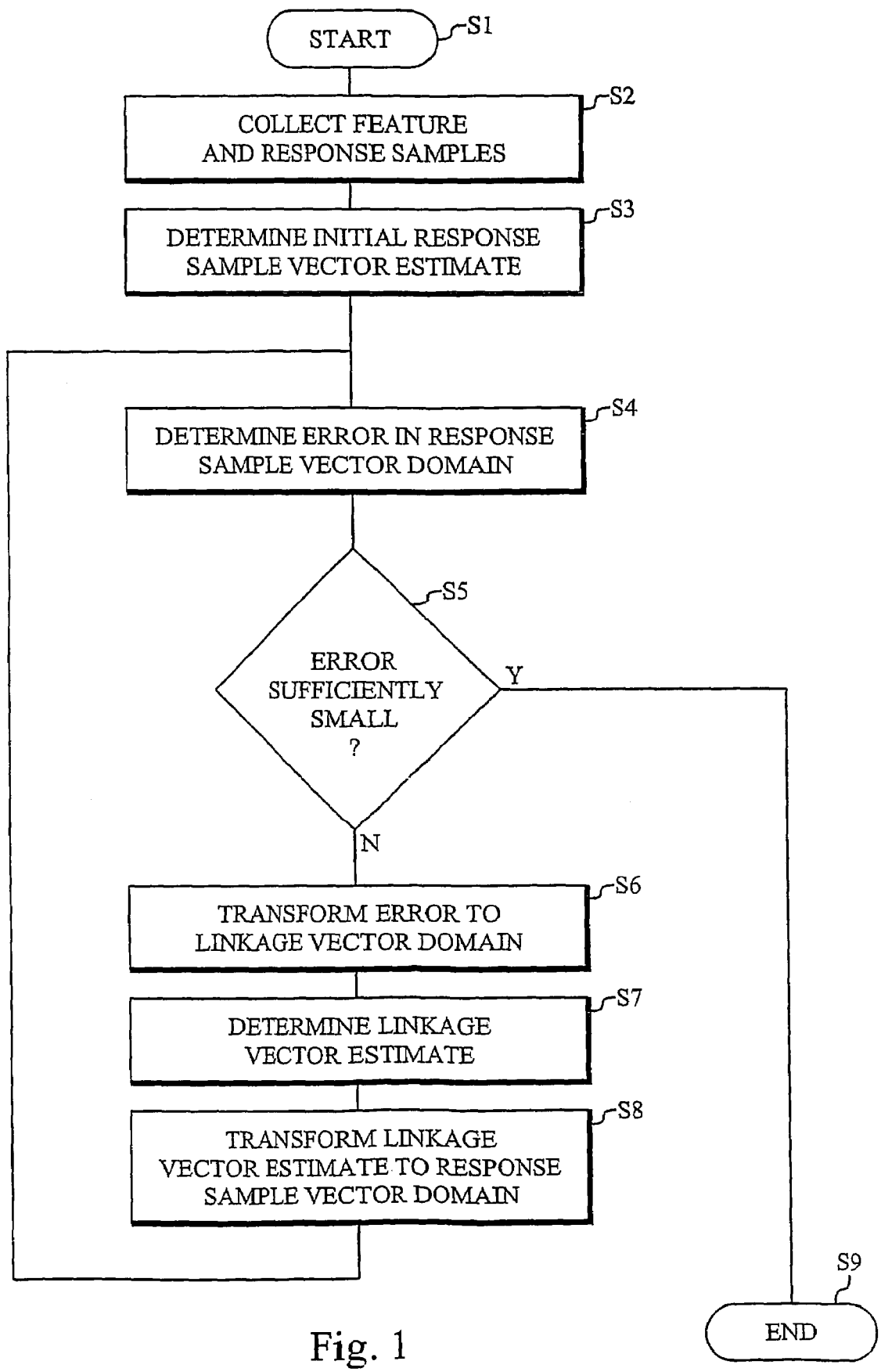
FIG. 1 is a flow chart illustrating an exemplary embodiment of the training method in accordance with the present invention.

Studying the structure of equation (2) reveals that each row of U actually requires knowledge of only the corresponding row of C. For example, row k of U, which is denoted $u_k$, requires knowledge of only row k of C, which is denoted $c_k$. This can be seen from the explicit equation:

$$u_k = \begin{pmatrix} \vdots & \vdots & \cdots & \vdots \\ u_k^1 & u_k^2 & \cdots & u_k^N \\ \vdots & \vdots & \vdots & \vdots \\ \vdots & \vdots & \cdots & \vdots \end{pmatrix} \qquad (3)$$

$$= \begin{pmatrix} \vdots & \vdots & \cdots & \vdots \\ c_{kI} & c_{k2} & \cdots & c_{kH} \\ \vdots & \vdots & \vdots & \vdots \\ \vdots & \vdots & \cdots & \vdots \end{pmatrix} \begin{pmatrix} a_1^1 & a_1^2 & \cdots & a_1^N \\ a_2^1 & a_2^2 & \cdots & a_2^N \\ \vdots & \vdots & \vdots & \vdots \\ a_H^1 & a_H^2 & \cdots & a_H^N \end{pmatrix}$$

$$= c_k A$$

Thus, equation (1) may be solved by independently determining each row of linkage materix C. Furthermore, it has been shown in WO 00/58914 that it is possible to represent a response state either in scalar representation or channel (vector) representation, and that it is possible to transform a scalar quantity into a vector quantity, or vice versa. Thus, it is possible to transform each column vector of response matrix U into a scalar, thereby obtaining a response sample (row) vector u containing these scalars as components. This response sample vector u will be linked to feature matrix A in accordance with:

$$u = (u^1 \quad u^2 \quad \cdots \quad u^N) \qquad (4)$$

$$= (c_1 \quad c_2 \quad \cdots \quad c_H) \begin{pmatrix} a_1^1 & a_1^2 & \cdots & a_1^N \\ a_2^1 & a_2^2 & \cdots & a_2^N \\ \vdots & \vdots & \vdots & \vdots \\ a_H^1 & a_H^2 & \cdots & a_H^N \end{pmatrix}$$

$$= cA$$

Thus since equations (3) and (4) have the same structure, it is appreciated that the fundamental problem is to solve an equation having the form:

$$u = cA \qquad (5)$$

where u and A are known, while c is to be determined.

A problem with equation (5) is that response sample vector u and linkage vector c typically lie in different vector spaces or domains, since feature matrix A typically is rectangular and not square (H is generally not equal to N in equation (4)). Thus, feature matrix A has no natural inverse. In accordance with the present invention an iterative method is used to determine c from A and u. Since u is known, a current estimate $\hat{u}(i)$ of response sample vector u is formed in the response domain, and the error $\Delta u = \hat{u}(i) - u$ is transformed into a corresponding linkage vector error $\Delta c$ in the linkage vector domain using the transpose of feature matrix A. This linkage vector error is subtracted from a current linkage vector estimate ĉ(i) to form an updated linkage vector estimate ĉ(i+1). This updated estimate is transformed back to the response sample vector domain using feature matrix A, thereby forming an updated response sample vector estimate û(i+1). Thus, the iterative steps of this process may be written as:

$$\hat{c}(i+1) = \hat{c}(i) - \underbrace{\overbrace{(\hat{u}(i)-u)}^{\Delta c} \cdot A^T}_{\Delta u} \quad (6)$$

$$\hat{u}(i+1) = \hat{c}(i+1) \cdot A$$

This procedure is illustrated in the flow chart of FIG. 1. The procedure starts in step S1. Step S2 collects feature and response samples. Step S3 determines an initial response sample vector estimate, typically the zero vector. Step S4 determines the error in the response sample vector domain. Step S5 tests whether this error is sufficiently small. If not, the procedure proceeds to step S6, in which the error is transformed to the linkage vector domain. Step S7 determines a linkage vector estimate using the transformed error. Step S8 transforms this estimate back to the response sample vector domain. Thereafter the procedure loops back to step S4. If the error is sufficiently small in step S5, the procedure ends in step S9.

FIG. 2 illustrates an exemplary structure of a training system suitable to perform the described inventive method. A response domain error is formed in an adder 10 by subtracting the actual response sample vector u from its corresponding estimate û. The response domain error is forwarded to a transformation or sampling block 12 (the transformation of the error by $A^T$ may be viewed as a form of sampling). This block may also perform a normalization, a process that will be further described below. The resulting linkage vector domain error is subtracted from a current linkage vector estimate in an adder 14. This current linkage vector estimate is stored and has been delayed in a delay and storage block 16. The updated linkage vector estimate is forwarded to a transformation or reconstruction block 18, which produces an updated response sample vector estimate. This block may also perform a normalization, a process that will be further described below. The updated linkage vector estimate is also forwarded to delay and storage block 16. Both transformation blocks 12, 18 base their transformations on feature matrix A. Typically the blocks of FIG. 2 are implemented by one or several micro processors or micro/signal processor combinations and corresponding software. They may, however, also be implemented by one or several ASICs (application specific integrated circuits).

An alternative to (6) is to change the order in the iteration in accordance with:

$$\hat{u}(i+1)=\hat{c}(i)\cdot A$$

$$\hat{c}(i+1)=\hat{c}(i)-(\hat{u}(i+1)-u)\cdot A^T \quad (7)$$

In a preferred embodiment of the present invention feature matrix A, its transpose or both are normalized. For example, in a mixed normalization embodiment the matrix $A^T$ in the linkage vector equation is feature normalized by the diagonal normalization matrix $N^F$ defined as:

$$N^F = \begin{pmatrix} 1/\sum_{n=1}^{N} a_1^n & 0 & \cdots & 0 \\ 0 & 1/\sum_{n=1}^{N} a_2^n & 0 & \vdots \\ \vdots & 0 & \ddots & 0 \\ 0 & \cdots & 0 & 1/\sum_{n=1}^{N} a_H^n \end{pmatrix} \quad (8)$$

and the matrix A in the response vector equation is feature normalized by the diagonal normalization matrix $N^S$ defined as:

$$N^S = \begin{pmatrix} 1/\sum_{h=1}^{H} a_h^1 & 0 & \cdots & 0 \\ 0 & 1/\sum_{h=1}^{H} a_h^2 & 0 & \vdots \\ \vdots & 0 & \ddots & 0 \\ 0 & \cdots & 0 & 1/\sum_{h=1}^{H} a_h^N \end{pmatrix} \quad (9)$$

Thus, in this mixed embodiment the feature normalization factors are obtained as the inverted values of the row sums of feature matrix A, while the sample normalization factors are obtained as the inverted values of the column sums of A. With this normalization (6) and (7) may be rewritten as:

$$\hat{c}(i+1)=\hat{c}(i)-(\hat{u}(i)-u)\cdot N^F \cdot A^T$$

$$\hat{u}(i+1)=\hat{c}(i+1)\cdot N^S \cdot A \quad (10)$$

and $$\hat{u}(i+1)=\hat{c}(i)\cdot N^S \cdot A$$

$$\hat{c}(i+1)=\hat{c}(i)-(\hat{u}(i+1)-u)\cdot N^F \cdot A^T \quad (11)$$

respectively. As a further illustration with an explicit MATLAB® code implementation of (10) follows.

In MATLAB® notation the mixed normalization procedure may be written as:

```
Ns=sum(A); % Sample norms of A
Asn=(diag(1./Ns)*A')'; % Sample normalize A
Nf=sum(A'); % Feature norms of A
Afn=diag(1./Nf)*A; % Feature normalize A
epsilon=0.05; % Desired relative accuracy
c_hat=0 0; % Initial estimate of c=zero vector
u_hat=0; % Initial estimate of u=zero vector
while norm(u_hat-u)/norm(u)>epsilon
  c_hat=c_hat-(u_hat-u)*Afn'; % Update estimate of c
  u_hat=c_hat*Asn; % Update estimate of u
end;
```

Here "." denotes element wise operations and "'" denotes transpose.

Another possibility involves only feature normalizing $A^T$ and retaining A without normalization in (6) and (7). In this case a suitable normalization matrix $N^F$ is given by:

$$N^F = \tag{12}$$

$$\begin{pmatrix} 1 \Big/ \sum_{n=1}^{N}\left(\sum_{h=1}^{H} a_h^n\right) a_1^n & 0 & \cdots & 0 \\ 0 & 1 \Big/ \sum_{n=1}^{N}\left(\sum_{h=1}^{H} a_h^n\right) a_2^n & 0 & \vdots \\ \vdots & 0 & \ddots & 0 \\ 0 & \cdots & 0 & 1 \Big/ \sum_{n=1}^{N}\left(\sum_{h=1}^{H} a_h^n\right) a_H^n \end{pmatrix}$$

With this normalization (6) and (7) may be rewritten as:

$$\hat{c}(i+1) = \hat{c}(i) - (\hat{u}(i) - u) \cdot N^F \cdot A^T$$

$$\hat{u}(i+1) = \hat{c}(i+1) \cdot A \tag{13}$$

and $$\hat{u}(i+1) = \hat{c}(i) \cdot A$$

$$\hat{c}(i+1) = \hat{c}(i) - (\hat{u}(i+1) - u) \cdot N^F \cdot A^T \tag{14}$$

respectively. Following is a further illustration that includes an explicit MATLAB® code implementation of (13).

In MATLAB® notation the feature domain normalization procedure may be written as:
  Nf=sum(A)*A'; % Feature norms of A
  Afn=diag(1./Nf)*A; % Feature normalize A
  epsilon=0.05; % Desired relative accuracy
  c_hat=0; % Initial estimate of c=zero vector
  u_hat=0; % Initial estimate of u=zero vector
  while norm(u_hat−u)/norm(u)>epsilon
  c_hat=c_hat−(u_hat−u)*Afn'; % Update estimate of c
  u_hat=c_hat*A; % Update estimate of u
  end;

Still another possibility involves only sample normalizing A and retaining $A^T$ without normalization in (6) and (7). In this case a suitable normalization matrix $N^S$ is given by:

$$N^S = \tag{15}$$

$$\begin{pmatrix} 1 \Big/ \sum_{h=1}^{H}\left(\sum_{n=1}^{N} a_h^n\right) a_h^1 & 0 & \cdots & 0 \\ 0 & 1 \Big/ \sum_{h=1}^{H}\left(\sum_{n=1}^{N} a_h^n\right) a_h^2 & 0 & \vdots \\ \vdots & 0 & \ddots & 0 \\ 0 & \cdots & 0 & 1 \Big/ \sum_{h=1}^{H}\left(\sum_{n=1}^{N} a_h^n\right) a_h^N \end{pmatrix}$$

With this normalization (6) and (7) may be rewritten as:

$$\hat{c}(i+1) = \hat{c}(i) - (\hat{u}(i) - u) \cdot A^T$$

$$\hat{u}(i+1) = \hat{c}(i+1) \cdot N^S \cdot A \tag{16}$$

and $$\hat{u}(i+1) = \hat{c}(i) \cdot N^S \cdot A$$

$$\hat{c}(i+1) = \hat{c}(i) - (\hat{u}(i+1) - u) \cdot A^T \tag{17}$$

respectively. Following is a further illustration that includes an explicit MATLAB® implementation of (16).

In MATLAB® notation the sample domain normalization procedure may be written as:
  Ns=sum(A')*A; % Sample norms of A
  Asn=(diag(1./Ns)*A')'; % Sample normalize A
  epsilon=0.05; % Desired relative accuracy
  c_hat=0; % Initial estimate of c=zero vector
  u_hat=0; % Initial estimate of u=zero vector
  while norm(u_hat−u)/norm(u)>epsilon
  c_hat=c_hat−(u_hat−u)*A'; % Update estimate of c
  u_hat=c_hat*Asn; % Update estimate of u
  end;

In the description above the normalization has been expressed in matrix form. However, since these matrices are diagonal matrices, it is possible to write the iteration equations in an equivalent mathematical form that expresses the normalizations as vectors. For example, (10) may be rewritten as:

$$\hat{c}(i+1) = \hat{c}(i) - N^F \hat{\times} ((\hat{u}(i) - u) \cdot A^T)$$

$$\hat{u}(i+1) = N^S \hat{\times} (\hat{c}(i+1) \cdot A) \tag{18}$$

where $N^F$ and $N^S$ now are row vectors defined by the diagonal elements of the corresponding matrices.

An essential feature of the present invention is the fact that feature matrix A only contains non-negative elements. It is possible to show that the gradient of the error function $\Delta u_n$ is directly related to the elements of feature matrix A. A straightforward derivation gives:

$$\frac{\partial \Delta u_n}{\partial c_h} = a_h^n \tag{19}$$

Thus, it is appreciated that the gradient will also only contain non-negative values. This implies that it is not necessary to test the sign of the gradient. An increase of the value of a linkage vector component $c_h$ will move the error in a positive direction or not affect it at all. This feature is the basis for the fast iterative procedure in accordance with the present invention. A closer examination of the underlying problem reveals that the nonzero elements of A do not necessarily have to be positive. What is required is that they have a consistent sign (they are either all positive or all negative). Similar comments apply to u and c.

In the description above the entire feature matrix A is involved in the iteration. In an approximate embodiment, feature matrix A may be replaced by an approximation in which only the maximum value in each row is retained. This approximation may be used either throughout all equations, in one of the equations or only in selected occurrences of feature matrix A in the equations. An example of an approximate mixed normalization embodiment corresponding to equation (6) is given by the MATLAB® implementation below.

In MATLAB® notation the mixed approximate normalization procedure may be written as:
  [ra ca]=size(A); % Determine number of row and columns
  [av ap]=max(A'); % Find maxima of feature functions
  Ns=av*A; % Sample domain norms
  Asn=(diag(1./Ns)*A')'; % Sample normalize A
  epsilon=0.05; % Desired relative accuracy
  c_hat=0; % Initial estimate of c=zero vector
  u_hat=0; % Initial estimate of u=zero vector

```
while norm(u_hat-u)/norm(u)>epsilon
  delta_u=u_hat-u;
  c_hat=c_hat-delta_u(ap); % Update estimate of c
  u_hat=c_hat*Asn; % Update estimate of u
end;
```

In this example the approximation is used in the first row of equation (6). The advantage of such an approximate method is that it is very fast, since only the maximum element in each row is retained, while the rest of the elements are approximated by zeros. After normalization, the resulting normalized matrix will only contain ones and zeros. This means that a computationally complex matrix multiplication can be replaced by a simple reshuffling of error components in error vector $\Delta u$.

In a similar approximation it is also possible to approximate feature matrix A with a matrix in which only the maximum value of each column (sample vector) is retained. In a mixed normalization it is also possible to use both approximations, i.e. to use approximate both feature and sample normalization.

There are several possible choices of stopping criteria for the iterative training process described above.

One possibility is to use the average of the absolute value of the components of $\Delta u$, i.e.:

$$\frac{1}{N}\sum_{n=1}^{N}|\hat{u}_n - u_n| \qquad (20)$$

The iteration is repeated as long as a threshold epsilon is exceeded.

An alternative is to use the maximum error component of $\Delta u$, i.e.:

$$\max_{n}(|\hat{u}_n - u_n|) \qquad (21)$$

If large errors are considered more detrimental than smaller errors, the squared error can be used, i.e.:

$$\sum_{n=1}^{N}|\hat{u}_n - u_n|^2 \qquad (22)$$

The above described stopping criteria are based on an absolute scalar error estimate. However, relative estimates are also possible. As an example, the estimate:

$$\frac{\sum_{n=1}^{N}|\hat{u}_n - u_n|^2}{\sum_{n=1}^{N}u_n^2} \qquad (23)$$

has been used in the code in the appendices.

As an alternative, the iterations may be stopped after a predetermined number of iterations. A combination is also possible, i.e. if the error is not sufficiently small after a predetermined number of iterations the procedure is stopped. This may happen, for example, when some error components of the error vector remain large even after many iterations. In such a case the components of linkage vector c that have converged may still be of interest.

In many cases some elements of linkage vector estimate c approach the value zero during the iterative process. The result of this is that the corresponding rows of feature matrix A will be ignored and will not be linked to the response vector. In accordance with a procedure denoted "compaction", this feature may be used to remove the zero element in the linkage vector estimate (storing its position) and its corresponding row in the feature matrix. A new normalization may then be performed on the compacted feature matrix, whereupon the iterative procedure is re-entered. This compaction may be performed each time a linkage vector element approaches zero, preferably when it falls below a predetermined limit near zero. Since the position of the removed values is stored, the complete linkage vector can be restored when the non-zero elements have converged.

As has been noted above, equation (1) may be solved by independently determining each row of linkage matrix C. However, the described iterative procedure may be used also for the full matrices. As an example, (6) may be rewritten as:

$$\hat{C}(i+1) = \hat{C}(i) - \underbrace{\overline{(\hat{U}(i) - U) \cdot A^T}}_{\Delta U}^{\Delta C} \qquad (24)$$

$$\hat{U}(i+1) = \hat{C}(i+1) \cdot A$$

for the matrix case.

Since feature matrix A generally is a sparse matrix (most of the matrix elements are 0), it is preferable to implement the above described procedures in a computational system that supports sparse matrix operations. An example of such a system is MATLAB® by MathWorks Inc. This will reduce the storage requirements, since only non-zero elements are explicitly stored, and will also speed up computation, since multiplications and additions are only performed for non-zero elements.

In the description above the invention has been described with reference to an artificial vision system. However, the same principles may be applied to any percept-response system or associative network in which a feature vector including only non-negative elements is mapped onto a response vector (possibly including only 1 element) including only non-negative elements. Examples are sound processing systems and control systems based on changes in sensor variables, such as temperature, pressure, position, velocity, etc.

It will be understood by those skilled in the art that various modifications and changes may be made to the present invention without departure from the scope thereof, which is defined by the appended claims.

The invention claimed is:

1. An artificial vision system training method, including the steps:
   with an artificial vision system, sampling a set of feature sample vectors;
   with the artificial vision system, sampling a set of response sample scalars;
   in the artificial vision system, forming a feature matrix including feature sample vectors and a corresponding response sample vector including response sample scalars;
   in the artificial vision system, determining a linkage vector linking said feature matrix to said response sample vector, characterized by an iterative linkage vector determining method including the steps:

determining a response sample vector error estimate in the response sample vector domain;

transforming said response sample vector error estimate into a corresponding linkage vector error estimate in the linkage vector domain;

determining a linkage vector estimate in the linkage vector domain by using said linkage vector error estimate;

transforming said linkage vector estimate into a corresponding response sample vector estimate in the response sample vector domain;

repeating the previous iterative steps until the response sample vector error estimate is sufficiently small so that the artificial vision system is trained; and an iteration step including:

determining a response sample vector error estimate representing the difference between a current response sample vector estimate and said response sample vector;

using the transpose of said feature matrix for transforming said response sample vector error estimate into said linkage vector error estimate;

forming an updated linkage vector estimate by subtracting said linkage vector error estimate from a current linkage vector estimate; and using said feature matrix for transforming said updated linkage vector estimate into an updated response sample vector estimate.

2. An artificial vision system training method, including the steps:

with an artificial vision system, sampling a set of feature sample vectors;

with the artificial vision system, sampling a set of response sample scalars;

in the artificial vision system, forming a feature matrix including feature sample vectors and a corresponding response sample vector including response sample scalars;

in the artificial vision system, determining a linkage vector linking said feature matrix to said response sample vector, characterized by an iterative linkage vector determining method including the steps:

determining a response sample vector error estimate in the response sample vector domain;

transforming said response sample vector error estimate into a corresponding linkage vector error estimate in the linkage vector domain;

determining a linkage vector estimate in the linkage vector domain by using said linkage vector error estimate;

transforming said linkage vector estimate into a corresponding response sample vector estimate in the response sample vector domain;

repeating the previous iterative steps until the response sample vector error estimate is sufficiently small so that the artificial vision system is trained; and an iteration step including:

using said feature matrix for transforming a current linkage vector estimate into an updated response sample vector estimate;

determining a response sample vector error estimate representing the difference between said updated response sample vector estimate and said response sample vector;

using the transpose of said feature matrix for transforming said response sample vector error estimate into a linkage vector error estimate; and forming an updated linkage vector estimate by subtracting said linkage vector error estimate from said current linkage vector estimate.

3. The method of claim 1, characterized by feature normalizing said linkage vector error estimate.

4. The method of claim 3, characterized by a feature normalization represented by the diagonal elements of the matrix:

$$N^F = \begin{pmatrix} 1 \bigg/ \sum_{n=1}^{N}\left(\sum_{h=1}^{H} a_h^n\right) a_1^n & 0 & \cdots & 0 \\ 0 & 1 \bigg/ \sum_{n=1}^{N}\left(\sum_{h=1}^{H} a_h^n\right) a_2^n & 0 & \vdots \\ \vdots & 0 & \ddots & 0 \\ 0 & \cdots & 0 & 1 \bigg/ \sum_{n=1}^{N}\left(\sum_{h=1}^{H} a_h^n\right) a_H^n \end{pmatrix}$$

where $a_h^n$ denote the elements of said feature matrix,

N represents the number of feature sample vectors, and

H represents the number of components in each feature sample vector.

5. The method of claim 1, characterized by sample normalizing said updated response sample vector estimate.

6. The method of claim 5, characterized by a sample normalization represented by the diagonal elements of the matrix:

$$N^S = \begin{pmatrix} 1 \bigg/ \sum_{h=1}^{H}\left(\sum_{n=1}^{N} a_h^n\right) a_h^1 & 0 & \cdots & 0 \\ 0 & 1 \bigg/ \sum_{h=1}^{H}\left(\sum_{n=1}^{N} a_h^n\right) a_h^2 & 0 & \vdots \\ \vdots & 0 & \ddots & 0 \\ 0 & \cdots & 0 & 1 \bigg/ \sum_{h=1}^{H}\left(\sum_{n=1}^{N} a_h^n\right) a_h^N \end{pmatrix}$$

where $a_h^n$ denote the elements of said feature matrix,

N represents the number of feature sample vectors, and

H represents the number of components in each feature sample vector.

7. The method of claim 1, characterized by feature normalizing said linkage vector error estimate; and sample normalizing said updated response sample vector estimate.

8. The method of claim 7, characterized by a feature normalization represented by the diagonal elements of the matrix:

$$N^F = \begin{pmatrix} 1/\sum_{n=1}^{N} a_1^n & 0 & \cdots & 0 \\ 0 & 1/\sum_{n=1}^{N} a_2^n & 0 & \vdots \\ \vdots & 0 & \ddots & 0 \\ 0 & \cdots & 0 & 1/\sum_{n=1}^{N} a_H^n \end{pmatrix}$$

and a sample normalization represented by the diagonal elements of the matrix:

$$N^S = \begin{pmatrix} 1/\sum_{h=1}^{H} a_h^1 & 0 & \cdots & 0 \\ 0 & 1/\sum_{h=1}^{H} a_h^2 & 0 & \vdots \\ \vdots & 0 & \ddots & 0 \\ 0 & \cdots & 0 & 1/\sum_{h=1}^{H} a_h^N \end{pmatrix}$$

where $a_h^n$ denote the elements of said feature matrix,

N represents the number of feature sample vectors, and

H represents the number of components in each feature sample vector.

9. The method of claim 1, characterized by selectively replacing said feature matrix by an approximate feature matrix, in which only the maximum element is retained in each row and all other elements are replaced by zero.

10. The method of claim 1, characterized by selectively replacing said feature matrix by an approximate feature matrix, in which only the maximum element is retained in each column and all other elements are replaced by zero.

11. The method of claim 1, characterized in that all non-zero elements of said feature matrix have the same sign; and all non-zero elements of said response sample vector have the same sign.

12. The method of claim 2, characterized by feature normalizing said linkage vector error estimate.

13. The method of claim 12, characterized by a feature normalization represented by the diagonal elements of the matrix:

$$N^F = \begin{pmatrix} 1/\sum_{n=1}^{N}\left(\sum_{h=1}^{H} a_h^n\right)a_1^n & 0 & \cdots & 0 \\ 0 & 1/\sum_{n=1}^{N}\left(\sum_{h=1}^{H} a_h^n\right)a_2^n & 0 & \vdots \\ \vdots & 0 & \ddots & 0 \\ 0 & \cdots & 0 & 1/\sum_{n=1}^{N}\left(\sum_{h=1}^{H} a_h^n\right)a_H^n \end{pmatrix}$$

where $a_h^n$ denote the elements of said feature matrix,

N represents the number of feature sample vectors, and

H represents the number of components in each feature sample vector.

14. The method of claim 2, characterized by sample normalizing said updated response sample vector estimate.

15. The method of claim 14, characterized by a sample normalization represented by the diagonal elements of the matrix:

$$N^S = \begin{pmatrix} 1/\sum_{h=1}^{H}\left(\sum_{n=1}^{N} a_h^n\right)a_h^1 & 0 & \cdots & 0 \\ 0 & 1/\sum_{h=1}^{H}\left(\sum_{n=1}^{N} a_h^n\right)a_h^2 & 0 & \vdots \\ \vdots & 0 & \ddots & 0 \\ 0 & \cdots & 0 & 1/\sum_{h=1}^{H}\left(\sum_{n=1}^{N} a_h^n\right)a_h^N \end{pmatrix}$$

where $a_h^n$ denote the elements of said feature matrix,

N represents the number of feature sample vectors, and

H represents the number of components in each feature sample vector.

16. The method of claim 2, characterized by feature normalizing said linkage vector error estimate; and sample normalizing said updated response sample vector estimate.

17. The method of claim 16, characterized by a feature normalization represented by the diagonal elements of the matrix:

$$N^F = \begin{pmatrix} 1/\sum_{n=1}^{N} a_1^n & 0 & \cdots & 0 \\ 0 & 1/\sum_{n=1}^{N} a_2^n & 0 & \vdots \\ \vdots & 0 & \ddots & 0 \\ 0 & \cdots & 0 & 1/\sum_{n=1}^{N} a_H^n \end{pmatrix}$$

and a sample normalization represented by the diagonal elements of the matrix:

$$N^S = \begin{pmatrix} 1 / \sum_{h=1}^{H} a_h^1 & 0 & \cdots & 0 \\ 0 & 1 / \sum_{h=1}^{H} a_h^2 & 0 & \vdots \\ \vdots & 0 & \ddots & 0 \\ 0 & \cdots & 0 & 1 / \sum_{h=1}^{H} a_h^N \end{pmatrix}$$

where $a_h^n$ denote the elements of said feature matrix,

N represents the number of feature sample vectors, and

H represents the number of components in each feature sample vector.

18. The method of claim 2, characterized by selectively replacing said feature matrix by an approximate feature matrix, in which only the maximum element is retained in each row and all other elements are replaced by zero.

19. The method of claim 2, characterized by selectively replacing said feature matrix by an approximate feature matrix, in which only the maximum element is retained in each column and all other elements are replaced by zero.

20. The method of claim 2, characterized in that
- all non-zero elements of said feature matrix have the same sign; and
- all non-zero elements of said response sample vector have the same sign.

* * * * *